J. STRATTON & E. A. CLAREMONT.
EXTRUDING RUBBER AND THE LIKE.
APPLICATION FILED APR. 18, 1918.

1,302,484.

Patented Apr. 29, 1919.

Inventors:
John Stratton & Ernest Alexander Claremont.
by their Attorney:

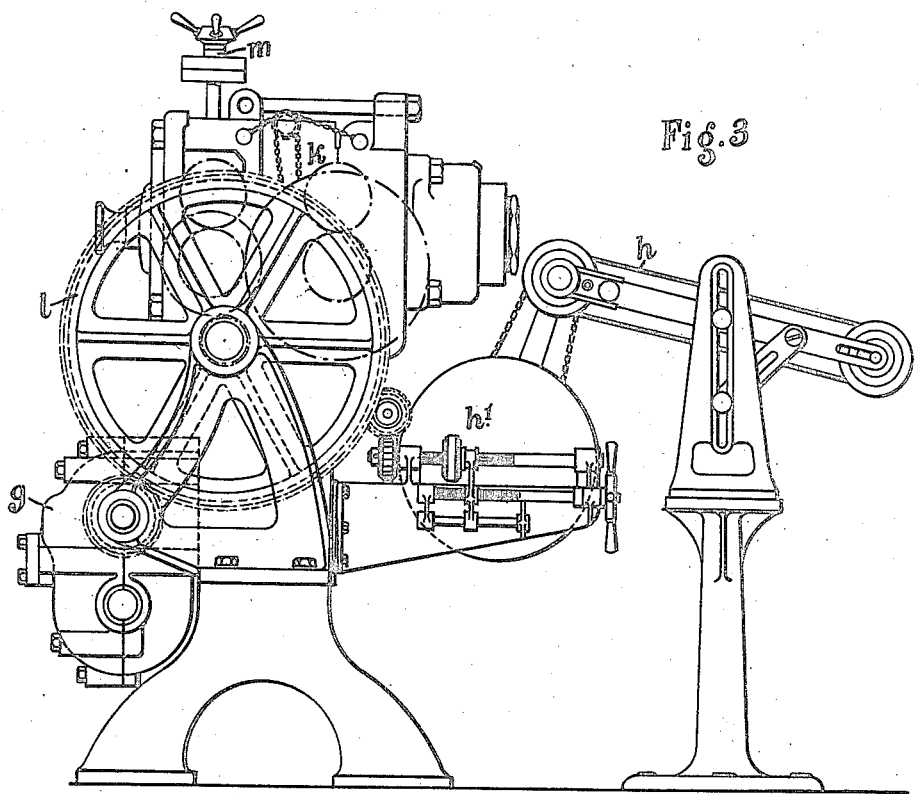

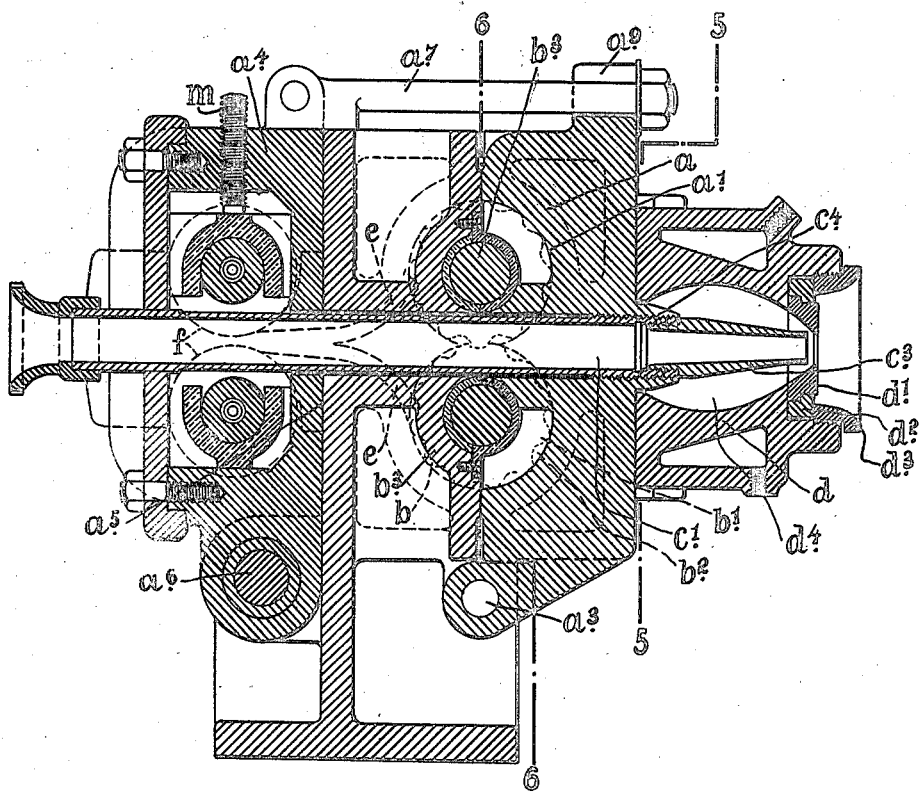

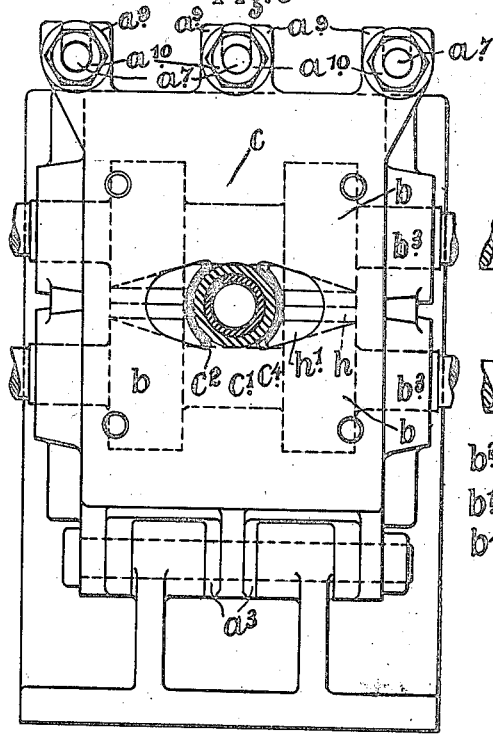
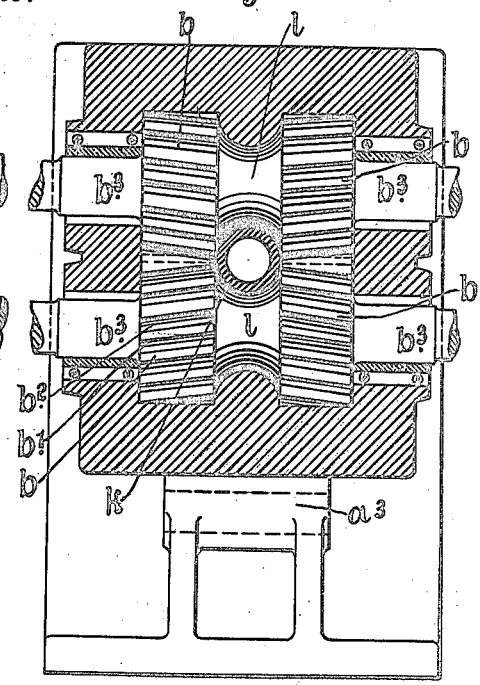

UNITED STATES PATENT OFFICE.

JOHN STRATTON, OF BOWDEN, AND ERNEST ALEXANDER CLAREMONT, OF HIGH LEGH, ENGLAND.

EXTRUDING RUBBER AND THE LIKE.

1,302,484.          Specification of Letters Patent.      Patented Apr. 29, 1919.

Application filed April 18, 1918. Serial No. 229,408.

*To all whom it may concern:*

Be it known that we, JOHN STRATTON, a subject of the King of England, residing at Bowden, Cheshire, in England, and ERNEST ALEXANDER CLAREMONT, a subject of the King of England, residing at High Legh, Cheshire, in England, have invented certain new and useful Improvements in Extruding Rubber and the like, of which the following is a specification.

This invention relates to the extruding of rubber and the like in pipe or other required form.

The object of this invention is to construct an improved machine or series of machines or apparatus by which rubber in a plastic condition or the like is introduced into the extruding machine and extruded in the desired form in a more efficient manner than any heretofore in vogue.

We construct the extruding machine as follows:—

We make a chamber internally in the form of two parallel cylinders intersecting one another so as to form in cross section approximately the outline of the figure 8. In each of the cylindrical sections of the chamber reaching from one flat end to the other is a roller with parallel projecting ribs or longitudinal teeth. These rollers (except for the spaces hereinafter referred to) occupy the whole of the chamber and are so constructed that as the rollers rotate on their axes the longitudinal teeth of the one engage with those of the other. Preferably each of the rollers has an axle integral therewith projecting at each end and supported and working in a bearing in the body of the chamber and at one end passing through a hole in the wall of the chamber and connecting with driving mechanism but the rollers might be otherwise suitably supported and driven. If only one of the rollers is to be directly driven as hereinafter explained then the axle of one only need pass through the wall of the chamber.

The chamber is provided with an extruding opening through its side and that part of the side which is in proximity thereto may be suitably shaped or inclined to form what we call the pressure chamber. The extruding opening is in proximity to and is preferably so placed that it is evenly bisected by the plane, which is at right angles to the plane of, is parallel to, and equi-distant from the axes of the rollers. Means are provided whereby the rubber or the like can be fed into the chamber through the side thereof and be evenly dispersed throughout the lengths of the successive spaces between the teeth with the necessary degree of regularity and consistency. For example the chamber may be provided with one or more openings or inlets suitably arranged to receive the rubber or the like on the side of the chamber opposite to the extrusion opening and preferably one or some above, and one or others below, the plane referred to as preferably bisecting the extrusion opening. We may arrange that the rubber shall be fed into the opening and dispersed as aforesaid by means of an ordinary pair of calender rollers.

The direction of rotation of the teeth rollers is such that the teeth are separating toward the openings or inlet to the chamber as above described and engaging toward the extrusion opening. The teeth are so shaped that when engaging they cause the rubber or the like between each successive pair of teeth to be displaced and deposited in the pressure chamber, or if none, behind the extrusion opening and by the constant compression thus created to be forced toward and through the extrusion opening.

We drive directly each of the rollers but the result desired might be attained (though perhaps not so efficiently) by driving one only directly that one necessarily driving the other.

We may if desired secured a more perfect discharge of the rubber or the like from between the teeth, by momentarily hastening each of the rollers in advance of the other alternately, or by driving one directly and the other indirectly alternately control the impingement of each tooth on the engaging tooth in front of it or the engaging tooth behind it as may be found desirable.

For the purpose (*a*) of preventing the pressure in the extrusion chamber from varying with wave-like recurrence as each space discharges its quantum of rubber or the like and (*b*) to further and better masticate the rubber we may arrange the teeth with a helical inclination on the rollers.

For the purpose of forming a covering of rubber or the like on an electric cable or other elongated article when it is necessary to pass the cable or article through the press we divide the chamber into two halves by a wall at right angles to the axes of the rollers in which we form a suitable passage way leading into the pressure chamber or into suitable proximity with the extrusion opening. The cable or article is passed through this passage way and through the extrusion opening, the passage way and opening being provided with a suitably shaped core and die and in this case each half of the chamber has separately driven rollers; or we may pass the cable or article through a tube cutting away the rollers to allow space for the same.
In the accompanying drawings is shown an example of our invention arranged with a vertical dividing wall with a passage way through the same to admit of a cable being passed through.
Figure 1 is a sectional elevation on the line 1—1 of Fig. 2.

Fig 3 is an elevation showing a general view of the complete machine.

Fig. 4 is a longitudinal vertical central section.

Fig. 5 is a vertical cross section on the line 5—5 of Fig. 4.
Fig. 6 is a cross section approximately on line 6—6 of Fig. 4.

Similar letters refer to similar parts in all the figures.

$a$ is the main frame of the machine. $a^1$ is the 8 shaped chamber. The main body opens on the line $a^2$ one part swinging on the hinge $a^3$, $a^4$ is the part containing the calender rollers, this part separates from the main body on the line $a^5$ swinging on the hinge $a^6$. $a^7$ is a threaded bolt (of which there are several) swinging on a hinge $a^8$ and which falls into a slot in the boss $a^9$ and is fastened by a nut $a^{10}$. $b$ are the rollers in the 8 shaped chamber with longitudinal projections or teeth shown as spirally inclined, $b^1$ and spaces $b^2$. $b^3$ are the shafts or axles by which the rollers are driven.

$c$ is the vertical dividing wall separating the 8 shaped chamber into halves with a bull nose projection in the center protruding into the core box hereinafter referred to. Through the center of the wall and the bull nose projection is a circular passage way $c^1$ internally threaded at one end which receives the sleeve $c^2$ externally threaded to engage therewith and internally threaded at one end to engage with the thread of the core $c^3$.
$d$ is a core box bolted onto the main frame, $d^1$ is a die held in position by suitable means such as the ring $d^2$ and nut $d^3$, $d^4$ is a jacket for controlling temperature and may be supplied with cold water for cooling or steam for heating.

$e$ are openings or inlets into the 8 shaped chamber to introduce the rubber.

$f$ are calender rollers to feed the rubber into the 8 shaped chamber, $f^1$ are scrapers or doctors to take the rubber off the rollers and guide it into the passage way, $f^2$ is a table to receive the rubber being supplied to the calender rollers.

$f^3$ and $f^4$ are guide plates by the sides of the calender rollers to guide the rubber.

Referring to Fig. 3 $g$ is a three speed gear box, $h$ is an adjustable conveyer to receive the extruded rubber article as it leaves the machine, $h^1$ is a variable speed mechanism controlling the rollers of the conveyer, $k$ is a mechanism for controlling the opening of the apparatus on the line $a^2$, $l$ is the driving wheel to which the various moving parts are suitably geared, $m$ is an adjusting screw to vary the distance between the calender rollers.

The method of operation is as follows:—

Figure 1:
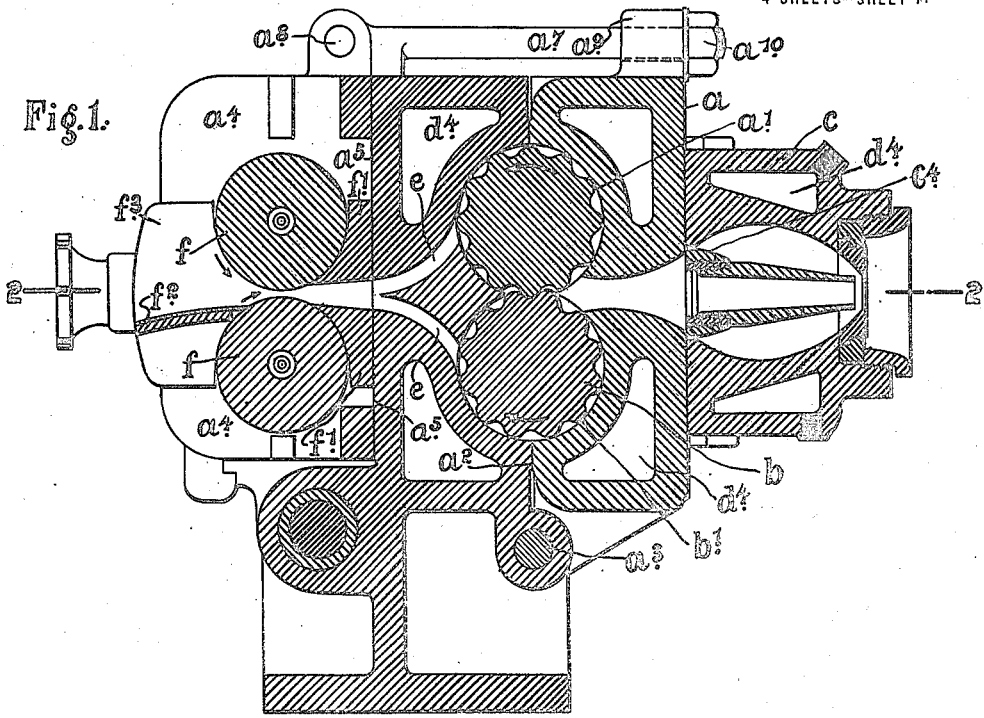
Figure 2:
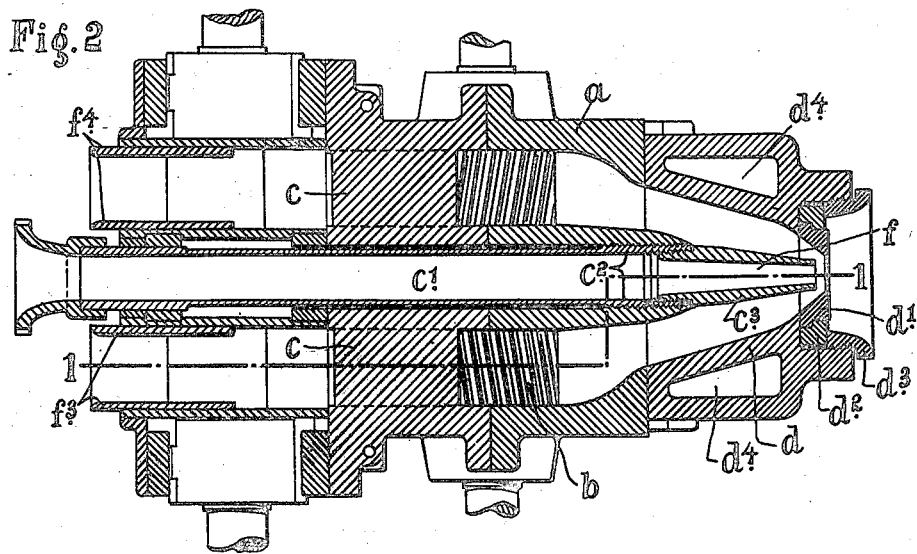
Fig. 2 is a sectional plan on the line 2—2 of Fig. 1.

The extrusion rollers $b$ and the feed rollers $f$ are revolved in the directions indicated by the arrows in Fig. 1.

The rubber or material which it is desired to extrude is first formed into strips of a suitable width and thickness to introduce between the feed rollers $f$.

By means of the adjusting screw $m$ the feed rollers are adjusted so as to pass forward a sufficient quantity of material to fill entirely the spaces $b^2$ between the teeth $b^1$ of the rollers $b$.

As the extrusion rollers revolve in the directions indicated by the arrows, the material is carried around the periphery of the rollers until it reaches the point at which the teeth $b^1$ interlock.

The teeth are so shaped that the material is then forced out of the spaces $b^2$ in a thoroughly masticated condition and it is thus deposited in and forced along the extrusion chamber and through the extrusion opening between the core $c^3$ and the die $d^1$ on to the cable which is drawn through the sleeve $c^2$ in the ordinary way.

In Fig. 5 is indicated the shape of the passage way through which the rubber passes on leaving the rollers.

The cross section shape of such passage way merges from the rectangular $h$ into the half moon shape $h^1$ and ultimately into the circular when it is concentric with and is evenly disposed around the bull nose projection.

In Fig. 6 $k$ is a pipe from the back of the machine to the core boss in lieu of the dividing wall a groove $l$ being out in the rollers to make room for same.

What we claim as our invention and desire to secure by Letters Patent of the United States is:—

1. A machine for extruding rubber and the like comprising in combination a chamber internally of the form of two parallel cylinders intersecting one another and presenting in cross section approximately the outline of the figure 8, a roller in each cylindrical section extending from one flat side or end to the other (except for the spaces between the projections or teeth hereinafter referred to) and occupying the whole of the chamber and provided with parallel projecting ribs or teeth, the said projections or teeth of one roller engaging those of the other, means for introducing the rubber in a plastic condition through the side of the chamber into the spaces between the projections or teeth, an extruding chamber in the side of the chamber having an opening through which the rubber is extruded, and means for driving the rollers.

2. A machine for extruding rubber and the like comprising in combination a chamber internally of the form of two parallel cylinders intersecting one another and presenting in cross section approximately the outline of the figure 8, a roller in each cylindrical section extending from one flat end to the other and (except for the spaces between the projections or teeth hereinafter referred to) occupying the whole of the section of the chamber and provided with parallel projecting ribs or teeth, the said projections or teeth of one such roller engaging with those of the other, means for introduction of plastic rubber to said chamber having narrow passage ways leading respectively to each of the cylindrical sections of such chambers through the side of the chamber extending substantially from one flat end thereof to the other, an extruding chamber and means for driving said rollers.

3. In combination with the machine as claimed in claims 1 and 2, calender rollers for forcing the rubber or the like through the openings or passage ways into the chamber, and tables and guides to receive the rubber or the like to and between the calender rollers.

4. In combination with the machine as claimed in claims 1, 2 and 3, a removable die for adjusting the extrusion opening and means for retaining the said die in position.

5. A machine as in claims 1, 2, 3 and 4 having means for receiving a cable or other article to be passed through the machine and out at the extruding opening for the purpose of covering the same with extruded rubber.

6. A machine as claimed in claims 1, 2, 3 and 4 the chamber being divided by a vertical wall at right angles to the axes of the rollers with a passage way therethrough to enable a cable or other article to be passed through the same, a core and means of fixing the core substantially as and for the purposes described.

In witness whereof we have signed this specification in the presence of two witnesses.

JOHN STRATTON.
ERNEST ALEXANDER CLAREMONT.

Witnesses:
C. A. NEALE,
FRED. CANDHIS.